E. B. PAUL.
COIN HANDLING MACHINE.
APPLICATION FILED MAR. 18, 1910. RENEWED JULY 23, 1914.
1,162,734.
Patented Nov. 30, 1915.
10 SHEETS—SHEET 1.
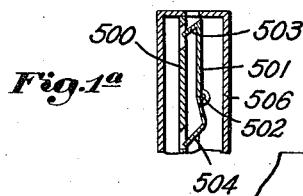
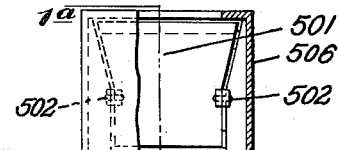
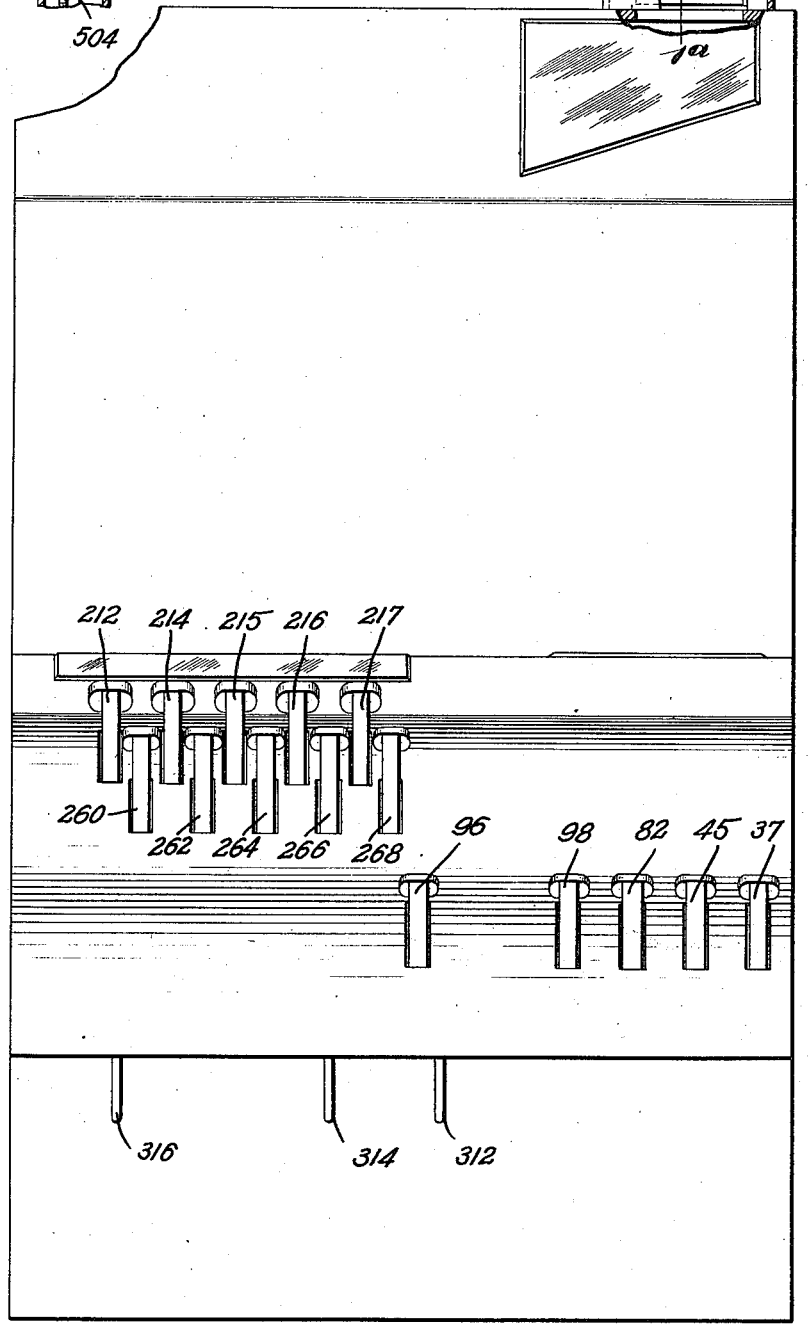
Witnesses:
Robert H. Kammler
Ernest A. Telfer
Inventor:
Edward B. Paul
by Emery & Booth
Attys.

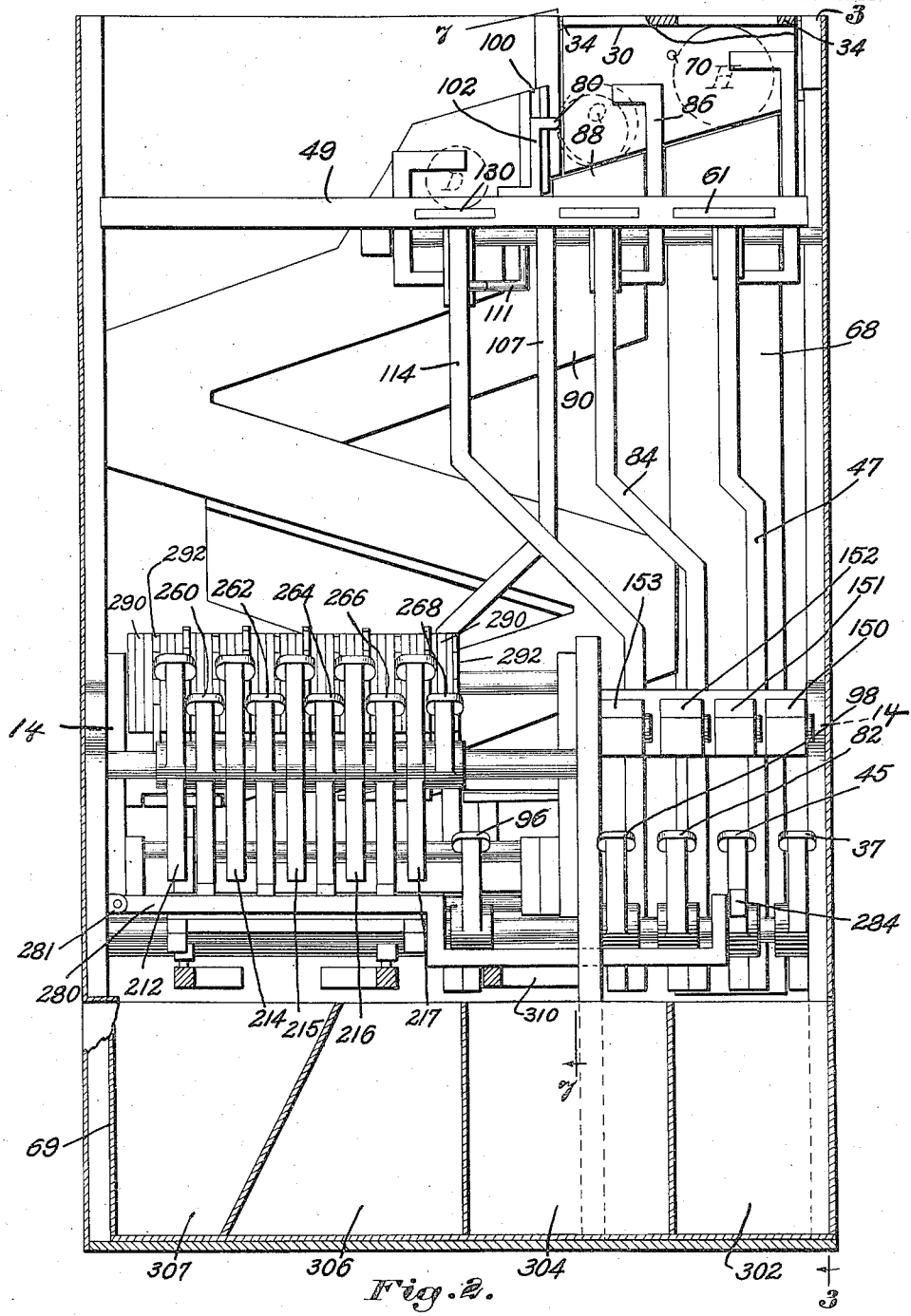

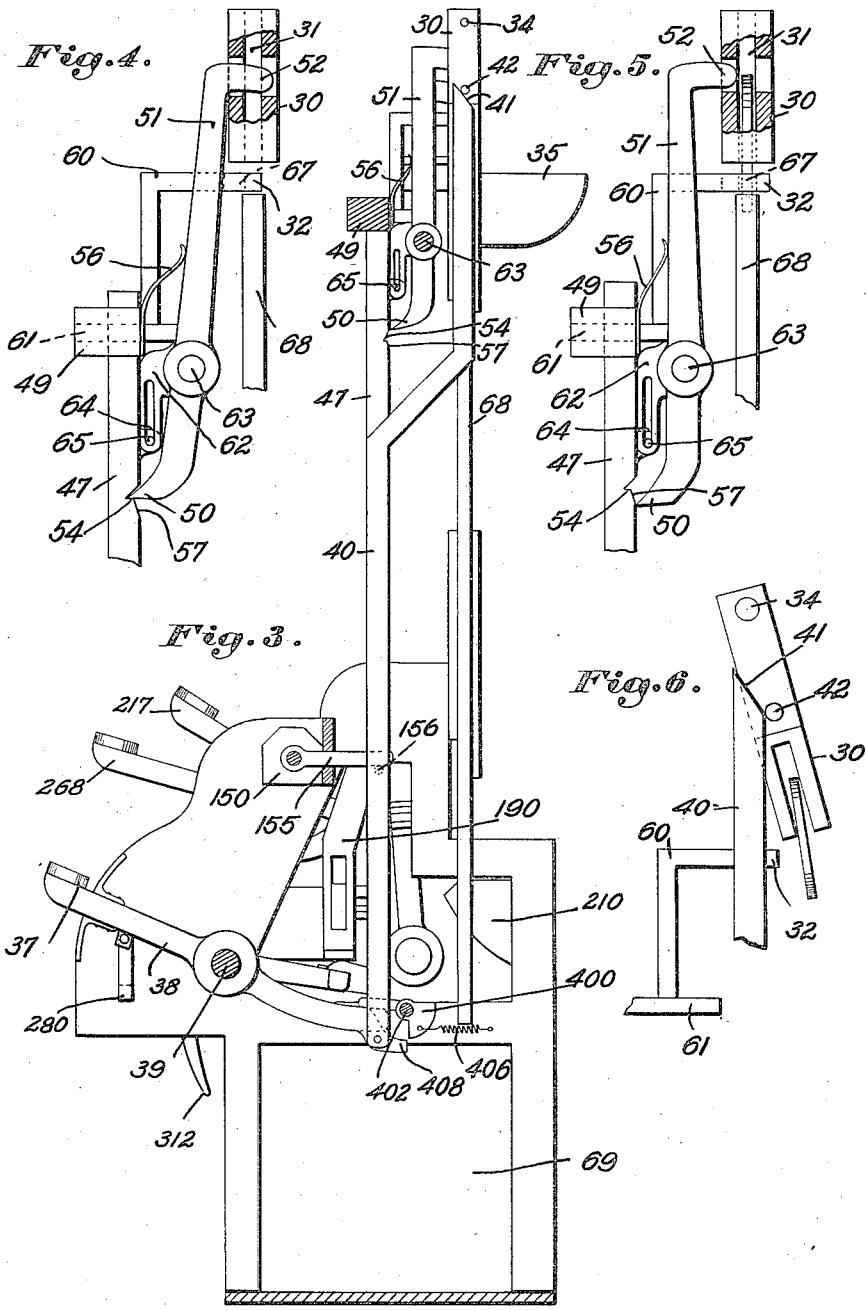

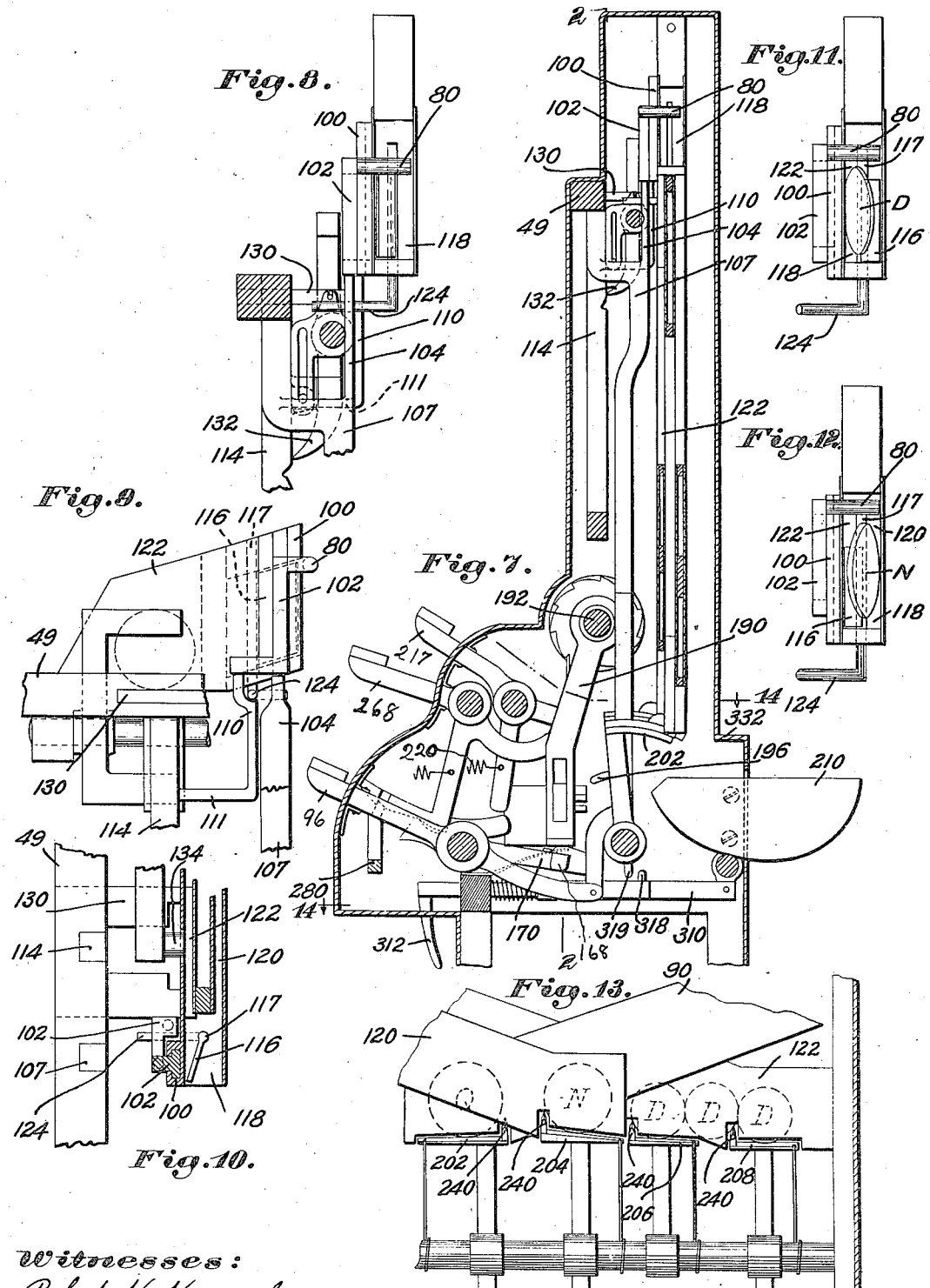

E. B. PAUL.
COIN HANDLING MACHINE.
APPLICATION FILED MAR. 18, 1910. RENEWED JULY 23, 1914.

1,162,734.

Patented Nov. 30, 1915.
10 SHEETS—SHEET 5.

Witnesses:
Robert H. Hammler.
Ernest A. Telfer.

Inventor:
Edward B. Paul
by Emery & Booth
Attys.

E. B. PAUL.
COIN HANDLING MACHINE.
APPLICATION FILED MAR. 18, 1910. RENEWED JULY 23, 1914.
1,162,734.
Patented Nov. 30, 1915.
10 SHEETS—SHEET 6.
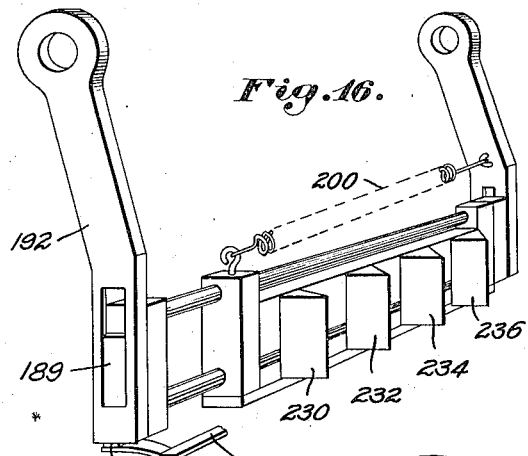
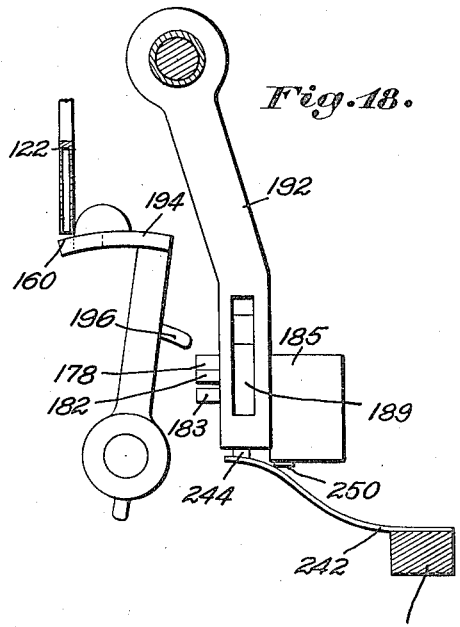
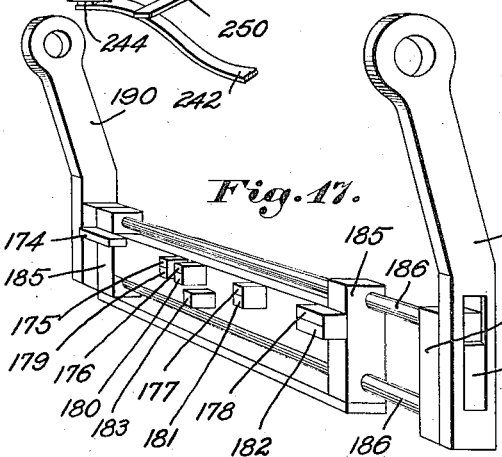
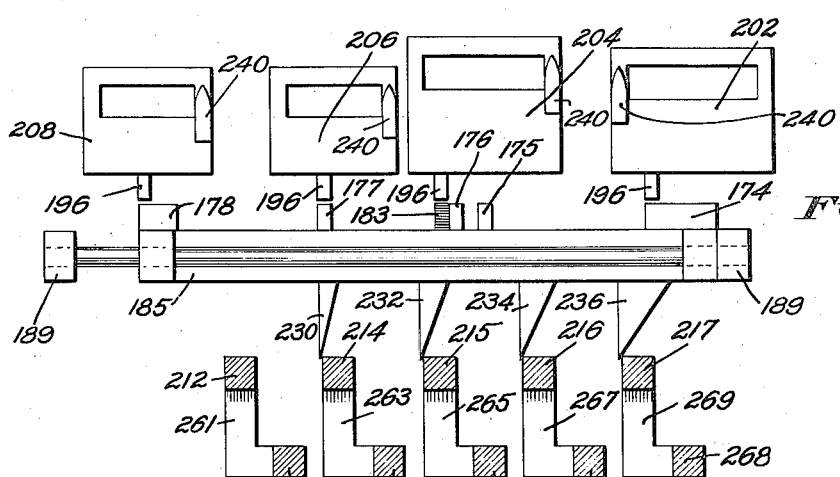

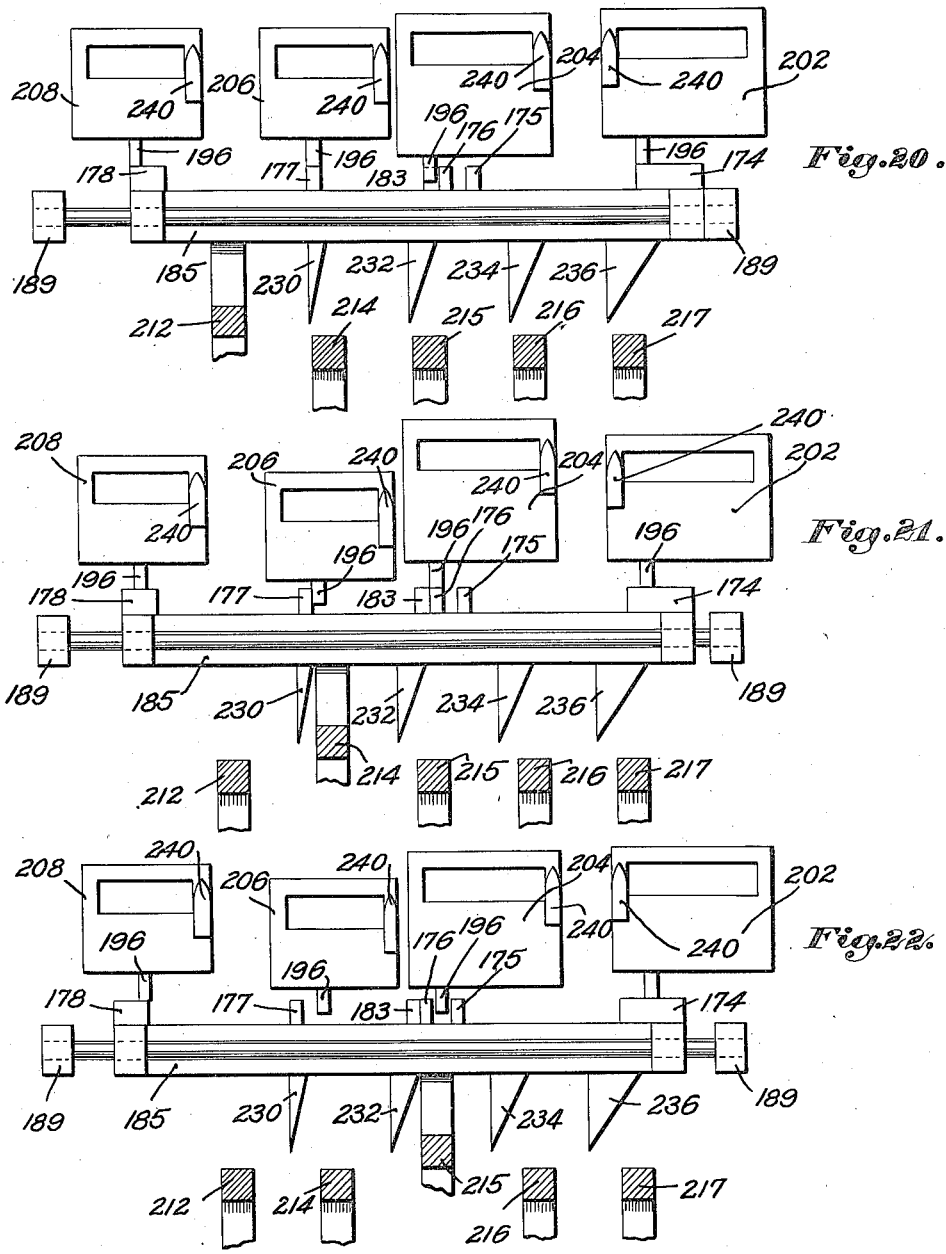

E. B. PAUL.
COIN HANDLING MACHINE.
APPLICATION FILED MAR. 18, 1910. RENEWED JULY 23, 1914.

1,162,734.

Patented Nov. 30, 1915.
10 SHEETS—SHEET 8.

Witnesses
Robert H. Kammler
Ernest A. Telfer

Inventor:
Edward B. Paul
by Emery & Booth
Att'ys.

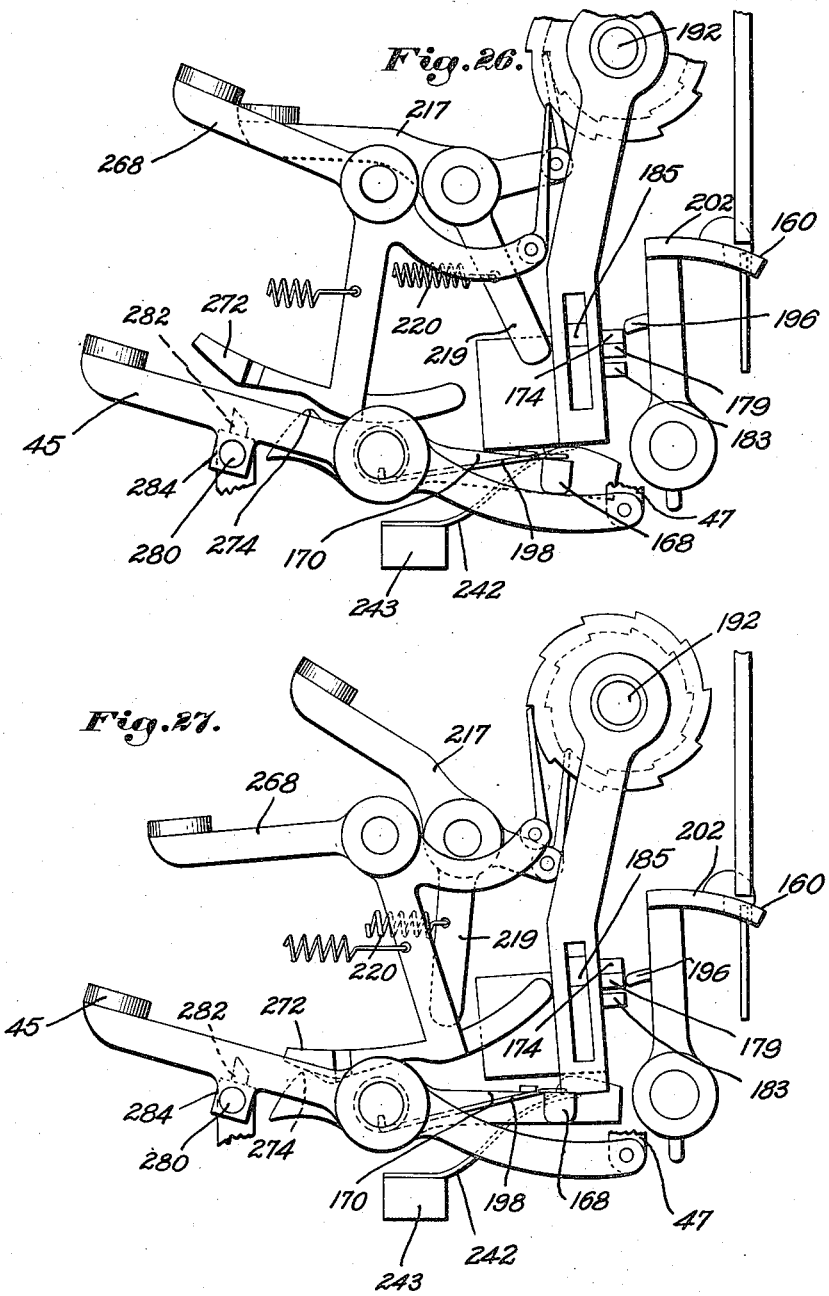

E. B. PAUL.
COIN HANDLING MACHINE.
APPLICATION FILED MAR. 18, 1910. RENEWED JULY 23, 1914.
1,162,734.
Patented Nov. 30, 1915.
10 SHEETS—SHEET 10.
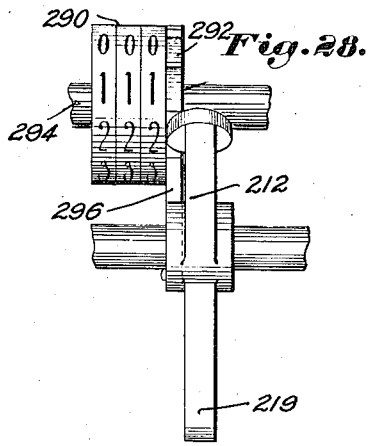
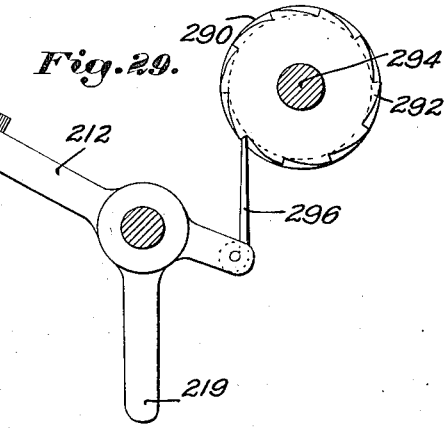
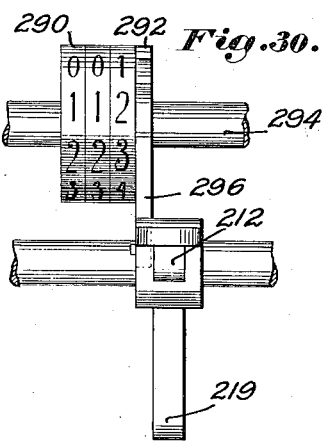
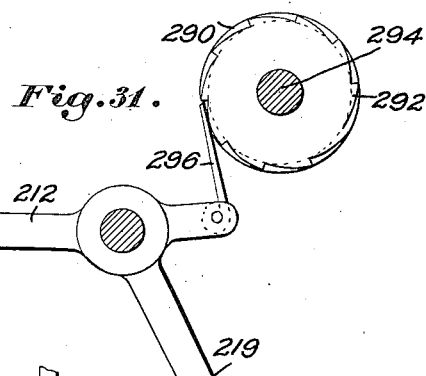
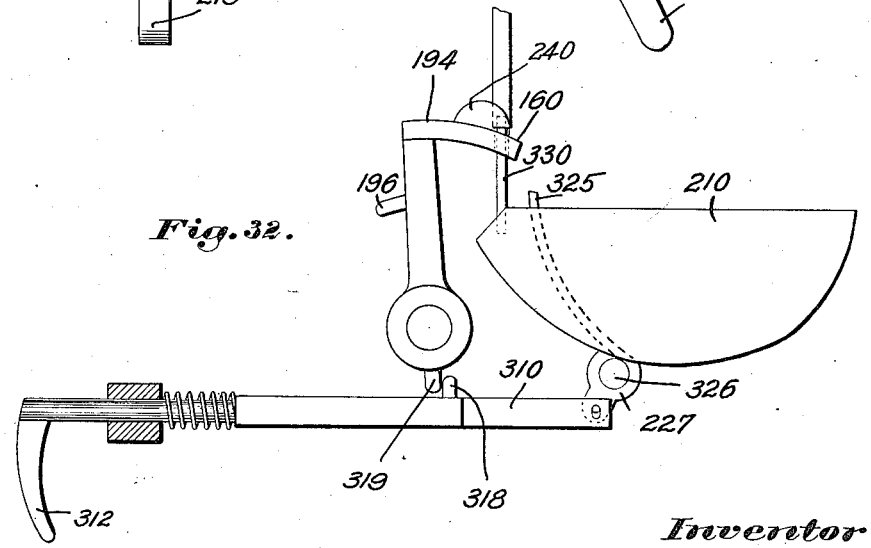
Witnesses:
Robert H. Kammler.
Ernest A. Telfer.
Inventor:
Edward B. Paul
by Emery & Booth.
Att'ys.

UNITED STATES PATENT OFFICE.

EDWARD B. PAUL, OF WINTHROP, MASSACHUSETTS, ASSIGNOR TO ANDREW J. STACEY, OF WYOMING, OHIO.

COIN-HANDLING MACHINE.

1,162,734.  Specification of Letters Patent.  Patented Nov. 30, 1915.

Application filed March 18, 1910, Serial No. 550,121. Renewed July 23, 1914. Serial No. 852,763.

*To all whom it may concern:*

Be it known that I, EDWARD B. PAUL, a citizen of the United States, and a resident of Winthrop, in the county of Suffolk and State of Massachusetts, have invented an Improvement in Coin-Handling Machines, of which the following description, in connection with the accompanying drawings, is a specification, like letters on the drawings representing like parts.

This invention relates to coin-handling machines and more particularly to change-making machines.

Among other objects the invention is intended to provide a machine of simple construction which shall be capable of making any desired change combination for coins of any practicable denomination and which is preferably inclosed against tampering and operable by simple external means.

Figure 14:
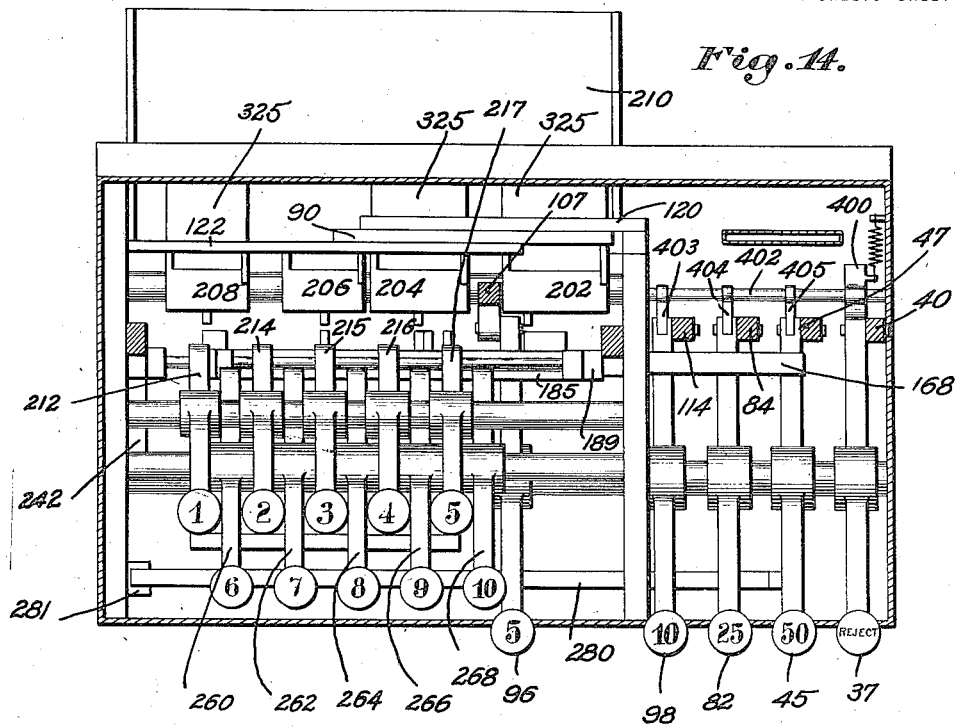
Figure 15:
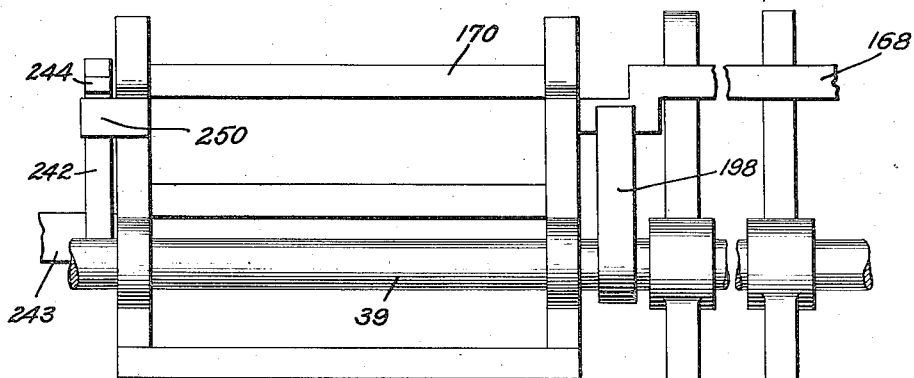

The character of the invention may be best understood by reference to the accompanying drawing, in which:

Figure 1 is a front elevation of a machine embodying the invention showing the mechanism inclosed in a casing. Fig. 1ª is a detail section on the line 1ª—1ª of Fig. 1. Fig. 2 is a front view of the machine (on a larger scale than Fig. 1), the front of the casing being removed to disclose the interior mechanism. Fig. 3 is a side elevation of the machine shown in Fig. 1, omitting the casing. Figs. 4 and 5 are enlarged detached views of the coin-admission mechanism shown in Fig. 3 and more fully described hereafter. Fig. 6 is an enlarged detached detail of part of the coin-ejector mechanism of Fig. 2. Fig. 7 is a side elevation of the machine shown in Fig. 1 on the line 7—7 of Fig. 1. Figs. 8, 9, 10, 11 and 12 are detached detail views of the dime and nickel admission-mechanism together with illustrative coin-assorting mechanism for assorting nickels and dimes. Fig. 13 is a rear view (from the right in Fig. 7) of part of the change-throwing mechanism. Fig. 14 is a section on the line 14—14 shown in Fig. 2. Fig. 15 is an enlarged detached plan view of a detail of the change-throwing mechanism. Figs. 16 and 17 are respectively front and rear perspectives of a part of the change-throwing mechanism. Fig. 18 is a side elevation of the parts shown in Figs. 16 and 17, together with a change-releasing shutter. Figs. 19 to 24 inclusive are diagrammatic plan views of the change-throwing and change-releasing mechanism each figure showing said mechanism in position to throw a certain amount of change. Fig. 25 is a detached perspective of illustrative change-throwing keys. Figs. 26 and 27 are detail side elevations of the change-throwing mechanism shown diagrammatically in Figs. 19 to 24 inclusive. Figs. 28 to 31 inclusive are detached detail views of an illustrative form of registering mechanism hereinafter more fully described. Fig. 32 is a detached detail end elevation of an auxiliary coin-throwing mechanism by which the coin raceways may be emptied into a preferably inclosed drawer of the machine.

The specific machine shown in the drawings is well adapted for use on pay-as-you-enter railway cars, and for convenience, will be described as applied to such use, although it is to be understood that the invention is not limited thereto.

The specific machine shown in the drawings is constructed to receive a nickel, a dime, a quarter or a fifty-cent piece, which, when deposited, is maintained temporarily in position to be inspected by the operator. If, upon inspection, the operator desires to reject the coin, he may throw it out of the machine by depressing the rejecting key. If the coin passes inspection, it is admitted into the machine by the operator depressing an admission key corresponding to the denomination of the admitted coin. The coin so admitted may pass into a storage raceway from which coins are taken in making change, or may be conveyed to a drawer or other receptacle inclosed within the casing. Depression of an appropriate admission key prepares the change-throwing mechanism for releasing from the machine any combination of change (in nickels or multiples thereof) from the coin of the denomination deposited and corresponding to the particular admission key depressed. The operator, holding the said admission key depressed, then depresses a change-throwing key corresponding to the amount of change desired to be released and thereby such amount of change is released or ejected into an appropriate pocket accessible to the depositor of the original coin. Various safe-guarding appliances are provided in the machine to prevent tampering and dishonest change making; these appliances comprise means for preventing more than a single change-throwing operation for each deposited coin of a large enough denomination to require change, and comprises also means for preventing any operation of the machine except upon deposit of one of the particular coins to which the machine is adapted.

It is to be understood, of course, that the description in the next preceding paragraph is merely explanatory of the specific illustrative machine of the drawings, and is not to be construed as limiting the invention to the particular mechanism or organization therein specified. On the contrary, said illustrative machine is only exemplary of a great variety of organizations in which the invention may be embodied, and of modes of operation by which the invention may be practised.

Referring now to Figs. 1 to 5 inclusive, the machine comprises a coin-receiving hopper 30, having a slot 31 therein of such dimensions as to receive a fifty cent piece, or any smaller coin. When the machine is at rest the slot 31 is provided with a floor 32 upon which the deposited coin rests. As shown in Fig. 2, the hopper 30 is mounted upon trunnions 34—34, permitting the hopper to be swung transversely toward the position shown in Fig. 6, in which the slot 31 is swung out of its normal position over the floor 32, so that a coin within the hopper is dropped out and into a rejected-coin pocket 35. The walls of the hopper 30, which are seen in front elevation in Fig. 2, are preferably transparent to permit the operator of the machine to inspect each coin as it is inserted. If it proves to be an improper coin, or if for any reason it is desired to be rejected, the hopper 30 is swung from the position shown in Fig. 3, to that shown in Fig. 6, to reject the coin, which, in the specific instance described, drops by gravity into the pocket 35. The coin-rejecting mechanism just described may be actuated by any practicable means. For example, a key 37 (Figs. 2 and 3) for this purpose may be arranged conveniently accessible to the operator and preferably adjacent other keys presently to be described. This key may constitute one end of a lever 38, fulcrumed to the frame of the machine at 39, and connected at its inner end to a coin-rejecting slide 40, having at its upper end a cam 41, arranged, when the slide 40 is elevated by depressing the key 37, to strike a pin 42 on the hopper 30, thereby to rock said hopper on its trunnions 34 from the position shown in Fig. 3 to that shown in Fig. 6. Fig. 2 shows within the hopper 30, in dotted lines, the various sizes of coins which the specific machine is adapted to handle, any or all of which may be rejected in the manner and by the means described above.

When a coin inserted in the hopper 30 is inspected and found satisfactory, it may then be admitted to storage space inclosed against tampering within the machine, as next described. Assume the deposit of a fifty cent piece in the position indicated by dotted lines in Fig. 2. To admit the same to the machine the operator depresses a key 45 (Figs. 2 and 7) at one end of a lever 46, similar to the lever 38 shown in Fig. 2, the inner end of said lever 46 being connected to a fifty-cent-admission slide 47 shown in Figs. 2, 3, 4 and 5. Normally, when at rest the slide 47 stands in the position shown in Fig. 3, its upper end being mounted to slide in a frame member 49, extending across the machine. When in this position the latching end 50 of a slide-locking lever 51 rests, as shown in Fig. 3, upon the side of the slide 47, the upper end of said lever 51 constituting a detector 52 which, at the appropriate time, feels for a coin in the slot 31 of the hopper. When the slide 47 is elevated by depressing the key 45 a recess 54 is presented opposite the latching end 50 of the lever 51, permitting the detector 52 to be pressed toward the right in Figs. 3, 4 and 5, to feel for coin in the slot 31. If the detector 52 encounters a coin in the slot 31, the latching end 50 is held out of the recess 54, leaving the slide 47 free to be elevated to admit the coin as presently described; if, on the other hand, the detector 52 encounters no fifty cent piece in the slot 31, the entire lever 51 is permitted to take the position shown in Fig. 4, wherein the latching end 50 has entered the recess 54 and engaged the tooth therein, which prevents further elevation of the slide 47. A leaf spring 56 tends to rock the lever 51 clockwise in Figs. 3, 4 and 5, and serves to throw said lever into the locking position of Fig. 4, whenever the detector 52 finds no coin in the slot 31, when the recess 54 in the slide 47 stands opposite the latching end 50. Whenever the detector 52 encounters a coin of the proper size, the slide locking lever 51 is thereby prevented from rocking far enough to engage its latching end 50 with the locking tooth 54 of the slide 47, and the latter is thereby permitted to continue its upward movement. During such upward movement the detector 52 may rest against the coin in the slot 31, until a cam 57 on the slide 47 strikes the latching end 50 and thereby rocks the lever 51 slightly contra-clockwise to remove the detector 52 from contact with the coin so that the detector shall not impede the admission of the coin when it has been once detected. By its full upward movement the slide 54 operates a shutter 60, a part of which consists of the coin-supporting floor 32 already referred to as standing normally underneath the slot 31. The shutter 60 is carried upon a slide 61, mounted in the frame piece 49; connected to said slide is a lever 62, fulcrumed on the shaft 63 of the lever 51. A slot 64 in one end of the lever 62 receives a pin 65, projecting from a lug fixed to the slide 47. When the slide 47 is in its lowermost position the pin 65 stands at the lower end of the slot 64, as shown in Fig. 3. As the slide 47 moves upwardly the pin 65 travels in the slot 64 at first without effect, until the slide reaches the position shown in Fig. 4, in which, if no coin be present in the slot 31, the latch 50 engages the recess 54 and locks the slide 47 against further elevation. In such case, the pin 65 has no effect upon the lever 62. If, however, the latch 50 is prevented from engaging the recess 54, by the presence of a coin in the slot 31, the slide 47 continues its upward movement and the pin 65, reaching the upper extremity of the slot 64, rocks the lever, throws the slide 61 toward the right and thereby throws the shutter 60 toward the right to move the coin-supporting floor 32 from under the slot 31 and to present thereunder a slot 67 in the shutter, which permits the coin to drop out of the hopper, through the slot 67 into a coin chute 68, through which the coin drops into a compartment of a drawer 69 at the bo.. a. of the machine.

The coin-admitting mechanism just described is preferably incapable of admitting any coin except of a particular denomination—for instance, a fifty cent piece in the exemplary case described. As shown in Fig. 2, a pin 70 will detain a fifty cent piece at the right hand end of the hopper in position to be encountered by the detector 52. Any smaller coin than a fifty cent piece will roll beneath the pin 70, down the inclined temporary floor of the hopper to a position remote from the detector 52, so that any attempt to depress the fifty cent key 45 upon deposit of a quarter, or small coin, would be prevented by the described action of the detector 52 and locking lever 51 arresting the upward movement of the slide 47.

In the illustrative machine, when a quarter is introduced to the hopper 30, it rolls down the inclined floor of the hopper under the pin 70 and striking against a detent 80 is detained in the position indicated in dotted lines in Fig. 2. When so positioned the quarter may be rejected by depressing the key 37 as already described. To admit the quarter to storage space within the machine, an admission mechanism may be operated by depressing a key 82 (Fig. 2) and thereby elevating a quarter-admission slide 84. The latter has a recess like the recess 54 shown in Fig. 3, to coöperate with a slide-locking lever 86 which may be like the lever 51 of Fig. 3. The lever 86 has a coin detector (like the detector 52) arranged to project into the hopper and encounter a quarter properly positioned therein as described. When the admission slide 84 makes its full upward movement, it moves a slide 88 to present a slot therein beneath the quarter and permit the latter to drop into a storage raceway 90 inclosed within the casing of the machine. The construction and operation of the slide 84, locking lever 86, and slide 88 may be substantially identical with that of the corresponding parts shown in Fig. 3.

Nickels and dimes when deposited in the hopper 30 roll down the floor thereof until they strike the detent 80 which holds them in substantially the position of the quarter in Fig. 2 until the nickel-admission key 96 or the dime-admission key 98 is depressed to lift the detent 80 as next described.

As best shown in Figs. 8, 9, and 10, the detent 80 is mounted in a vertical slide-way 100, and its shank 102 extends downwardly into position to be engaged and lifted, either by a finger 104 projecting upwardly from a nickel-admission slide 107 or by a finger 110 projecting upwardly from an arm 111 on a dime-admission slide 114. Thus by depressing either the dime-admission key 98 and elevating its slide 114, or the nickel-admission key 96 and elevating its slide 107, the detent 80 is thereby lifted to permit a coin to roll under the detent into an assorter next described. Up to the point just reached in this description, the dimes and nickels may have the same path in the machine; subsequently, however, it is desired to separate dimes from nickels and to send all of each denomination to an appropriate storage raceway from which they may be thrown in making change.

Referring to Figs. 7 to 11 inclusive—a gate 116 is shown just in front of the detent 80 and against which a coin strikes when the detent is lifted. The gate 116 is fixed on a shaft 117 journaled in the top and bottom walls of a chamber 118 to which coins are admitted by lifting the detent 80. In one position of the gate 116 shown in Figs. 10 and 12, a nickel (indicated by N in Fig. 12) is guided into a nickel raceway 120; while in its opposite position the gate 116 closes the raceway 120 and guides a dime (indicated by D in Fig. 11) into a dime raceway 122. To manipulate the gate for alternatively opening and closing the respective raceways, the shaft 117 has its lower end bent to form an operating arm 124 by which the shaft and gate may be oscillated. The gate operating arm 124 stands between the dime-admission finger 110 and the nickel-admission-slide finger 104 as shown in Fig. 8; and each finger has a cam to throw the arm 124 horizontally as the finger and its slide are elevated. As shown in Figs. 9 and 10, the arm and gate 116 are in position to admit a nickel to its raceway 120; if now the dime-admission slide 114 be elevated (by depressing the dime-admission key 98) the cam on the finger 110 will throw the arm 124 toward the right in Fig. 9 and contra-clockwise in Fig. 10 to close the nickel raceway and admit a dime to the dime-raceway. This leaves the arm 124 in the dotted line position of Fig. 9 where it stands in the path of the cam on the nickel-admission-slide finger 104, which when elevated opens the nickel raceway and closes the dime raceway. Thus the depression of either the nickel or dime key and consequent elevation of its slide, lifts the detent and lets the coin pass toward the gate, while at the same time the gate is thrown to proper position for guiding the coin to its appropriate raceway. A dime so admitted does not pass at once to its raceway but is detained in a chamber to be detected as in the case of the half dollar and quarter mechanisms hereinbefore described. A dime is shown in said chamber by dotted lines in Fig. 9. When so positioned the dime rests upon a movable floor supplied by a slide 130 similar to the slide or shutter 60 of Fig. 4, said slide being moved toward the right in Fig. 7 to present a slot under the dime permitting it to drop down finally into its storage raceway 122. The slide is so moved by the final upward travel of the dime-admission slide 114 which is subject to the action of a slide-locking lever 132 having a detector 134, which may be similar to the slide-locking levers and detectors hereinbefore described. In admitting a dime, the dime-admission key 98 is first partially depressed to elevate its slide 114 far enough to lift the detent 80 and permit the dime to take position over the slide 130; thereupon the dime stands in position to be detected by the detector 134; and the dime-admission slide is permitted its full upward movement past the slide-locking lever 132, to push the slide 130 toward the right in Fig. 10 to admit the dime finally to its storage raceway 122. In admitting a nickel, the nickel-admission key 96 is depressed to elevate the nickel admission slide 107 and lift the detent 80, whereupon the nickel is admitted at once to its raceway 120.

The above described slide-locking and detecting mechanisms are intended, as hereafter explained, to prevent operation of change-throwing mechanism except upon proper admission of a coin from which change is to be made. In the case of a nickel, however, no change is to be made therefrom in the specific mechanism, and no change-throwing mechanism can be actuated upon admission of a nickel; therefore it is unnecessary for the purposes of the specific machine to have any detecting operation in respect to a nickel.

It is preferred that each coin admission or rejecting operation be recorded or otherwise registered upon suitable registering mechanism provided for that purpose. For instance, referring to Fig. 2, four registers 150, 151, 152 and 153 are shown. These registers may be of the well-known "Veeder" type operated step-by-step by an oscillating arm. Referring to Fig. 3, the register 150 is shown coöperating with the coin-rejecting slide 40, the actuating arm 155 of the register 150 overlying a pin 156 on the slide 40. Similar arms for the other registers coöperate with similar pins on the half-dollar admission slide 47, the quarter admission slide 84 and the dime admission slide 114.

Referring now to Fig. 13, the quarter-storage raceway 90, the nickel-storage raceway 120 and the dime-storage raceway 122 are shown at their coin-releasing ends adjacent the change-throwing mechanism. As shown in Fig. 1, these several storage raceways extend from their upper ends down to their coin-releasing ends by a series of inclined chutes along which the respective coins readily travel by gravity. In Fig. 13 the different denominations of coins are indicated by dotted lines in the positions which they have in their raceways. When so positioned, each coin rests on a movable floor 160 (Fig. 18) of the change-throwing shutter. Under the dime raceways are two separately operable change-throwing shutters arranged so that either one or two dimes may be thrown in a change-throwing operation. A similar shutter permits the throwing of a nickel and another shutter permits the throwing of a quarter. The manner in which these shutters are operated will be next described.

Referring to Figs. 14, 15, 26 and 27—the illustrative organization of change-throwing mechanism is there well shown. Illustrated more or less diagrammatically in Figs. 26 and 27 is the fifty-cent admission key 45 and its lever, the fifty-cent admission slide 47 being broken away for simplification. When the slide 47 is permitted its full upward movement upon due detection of a coin to be admitted, the fifty-cent admission key lever 45 strikes and lifts an overlying arm 168 of a setting cradle 170 which preliminarily sets the change-throwing mechanism appropriately to the denomination of the admitted coin. The arm 168 of the cradle 170 extends over all of the coin-admission key levers for coins of large enough denomination to require change throwing and may be lifted through different distances by the respective levers as presently explained. The cradle 170 consists of a frame as shown in Fig. 15 pivoted on a shaft 39 of the coin-admission key levers. The position of the cradle 170, when at rest, is shown in Fig. 7. When the cradle is elevated by depressing one of the change-admission keys, it serves to lift a change throwing selector shown detached in Figs. 16 and 17.

Referring particularly to Fig. 17, the detector comprises a series of change-throwing selective lugs or wards 174, 175, 176, 177, 178, all arranged in the specific mechanism in the same horizontal plane or on the same level, and also a second series of selective lugs or wards 179, 180, 181 and 182, arranged in the same horizontal plane and on a lower level from the other group. Another selective lug or ward 183 is arranged at a still lower level. These wards are mounted upon a frame 185 which is supported for endwise sliding movement upon rods 186, 186. The opposite ends of the rods being mounted in slide blocks 188 having projections 189 engaging vertical slide ways in swinging arms 190. As shown in Fig. 7 the arms 190 are mounted upon a shaft 192 to swing freely thereon under the control of the change-throwing mechanism.

With the arrangement described, the selector or selector frame 185 is mounted for three different movements—a substantially vertical movement permitted by the blocks 189 sliding in the ways in the arms 190; a horizontal sliding movement on the rods 186; and a transverse change-throwing movement in which the selector and its supporting frame swing with the arms 190, 190 about the shaft 192. The purpose of the first of these movements, the substantially vertical movement, may be readily understood by reference to Fig. 18. Each of the change-releasing shutters shown in Fig. 13, of which the dime shutter 194 is shown in Fig. 18, has thereon a lug 196, all of the lugs 196 on the several change-releasing shutters being in substantially the same horizontal plane. The lugs 196 are intended to coöperate at proper times with the selective wards 174, etc., shown in Fig. 7, for instance with the wards 178, 182 and 183 of Fig. 18. Thus if the selector 185 be moved a certain distance upwardly from the position shown in Fig. 18, the top row of wards including the ward 178, will stand opposite the lugs 196; this position being illustrated in Fig. 26. If the selector 185 be elevated vertically a little farther, the second row of wards including the ward 182 of Fig. 18 and the ward 179 of Fig. 26, will stand opposite the lugs 196; this position being shown in Fig. 27. If the selector 185 be still further elevated, the lowermost single ward 183 will be positioned at the level of the lugs 196. Each of the described three levels to which the selector 185 may be moved vertically, corresponds to the denomination of coins to be changed, which the specific machine is adapted to receive. For example, the selector 185 is moved through its first and least vertical movement by depressing the fifty-cent admission lever to admit a fifty-cent piece as shown in Fig. 26. The shape and throw of the fifty-cent admission key lever 45 is such that the depression of the fifty-cent admission key can never elevate the selector above the position shown in Fig. 26. The selector 185 is moved to its intermediate position shown in Fig. 27 by depressing the twenty-five cent admission key; and is elevated vertically to its third and uppermost position by depressing the dime admission key. Accordingly the selector is initially moved by a coin-admission operation, to a definite position corresponding to the denomination of the admitted coin; and to permit the subsequent change-throwing operation, the selector must be held in its said position by holding the admission key depressed. If the coin-admission key be released without a change-throwing operation, the selector will be immediately returned to the inoperative position shown in Fig. 18 by means of a spring 198 acting upon the arm 168 of the cradle 170. So long as the coin-admission key corresponding to a coin large enough to require change, remains depressed, however, at least one of the rows of selective wards will stand in position to engage one or more of the lugs 196 on the change-releasing shutters. Thus, while the selector is held in elevated position such that some of its selective wards are in position to strike one or more lugs 196 on the change-throwing shutters, the entire selector is rocked toward the left in Fig. 18 (i. e. toward the right in Fig. 26) to the position shown in Fig. 26 whereby a temporary floor 160 positioned under a storage raceway is displaced from beneath the raceway and is replaced by a slot permitting a coin to drop out of the raceway.

For convenience in description, a cycle of change-throwing operations will be explained on the initial assumption that a fifty-cent piece has been deposited in the machine. The fifty-cent piece is admitted to the machine by depressing the fifty-cent admission key 45 which lifts the cradle 170 by its arm 168 and thereby lifts the selector 185, all to the positions shown in Fig. 26. This places the uppermost row of selective wards opposite the lugs 196 on the change-releasing shutters, this row of lugs including the wards 174, 175, 176, 177 and 178, shown in Fig. 17. These are shown in plan view in Fig. 19. It is evident that the coöperation between the wards and the several lugs 196 on the coin-releasing shutters will depend upon the horizontal position of the selector 185. For instance, in its normal position of rest, the selector stands as in Fig. 19 being there held yieldingly by a spring 200 shown in Fig. 16. When thus adjusted the ward 174 stands in position to strike the lug 196 on the quarter releasing shutter 202; neither the lug 175 nor 176 is in position to strike the lug 196 on the nickel releasing shutter 204 which will therefore remain idle. The ward 177 stands opposite the lug 196 of the first dime-releasing shutter 206; and the ward 178 stands opposite the lug 196 on the second-dime-releasing shutter 208. If, with these adjustments, the selector 185 be swung on the shaft 192 toward the left in Fig. 18, i. e. toward the right in Fig. 26 or toward the top of the sheet in Fig. 19, the quarter shutter 202 and the two dime shutters will be rocked toward the left in Fig. 18 to release a quarter and two dimes which will drop into the change-receiving pocket 210 shown in Fig. 7. Thus, with the described adjustment, an aggregate of forty-five cents in change is thrown.

To cause the described movement of the selector on the shaft 192 for the final step in change-throwing operation, any one of a number of change-throwing keys or the like may be employed, as for instance, the keys bearing the numerals 1 to 10 inclusive shown at the left of Fig. 14. The numerals on said keys indicate the number of five cent fares to be retained in the machine while by depressing any particular lever a certain amount of change is thrown, equaling the difference between the retained fares and the amount of an admitted coin, for instance, the one fare key comprises a lever 212; the two fare key a lever 214; the three fare key a lever 215; the four fare key a lever 216; the five fare key a lever 217. All of the levers 212 to 217 inclusive may be exactly like the lever 217 shown in Fig. 26, the same having a change-throwing pusher 219 to strike against the rear of the selector 185 to force the same toward the right in Fig. 26 to the position there shown. In said Fig. 26 the lever 217 is shown as depressed. In Fig. 27 the lever 217 is shown in its normal position of rest in which it is held by a spring 220, similar springs being applied preferably to the pusher arms of all of the levers 212 to 217 inclusive.

The six to ten-fare levers inclusive, shown in Fig. 14, will be disregarded for the present.

Bearing in mind that the pusher arm 219 of the lever 212 shown in cross-section in Fig. 19 is, in the specific machine, identical in construction with the lever 217 and pusher arm 219 of Fig. 26, it will be remembered that when the one fare key is depressed the lever 212 in Fig. 19 will be rocked to the position shown in Fig. 20 by which the selector 185 is pressed forwardly to operate the quarter and two dime shutters; in other words, with the described adjustment of the selector 185 resulting from depression of the fifty-cent admission key the subsequent depression of the one fare lever which is intended to retain a five cent fare, operates to throw forty-five cents in change. Upon depressing the two fare key lever 214 the latter strikes a cam 230 fixed upon the selector frame 185 as shown in perspective in Fig. 16. It will be remembered that the selector frame 185 is horizontally slidable on the rods 186 against the tension of the spring 200; and accordingly when the two-fare lever 214 is rocked to the position shown in Fig. 21, the selector frame 185 with its change-throwing wards will be moved horizontally a certain distance to the left from the position shown in Fig. 20, with the result well shown in Fig. 21, i. e. the ward 174 being of extensive horizontal length, is still in position to engage the lug 196 of the quarter shutter 202; the ward 176 is moved to position to coöperate with the lug 196 of the nickel shutter 204; the ward 177 is moved out of operative relation with the lug 196 of the dime shutter 206, and the ward 178, being of considerable horizontal extent, is still in position to engage the lug 196 of the dime shutter 208. The described horizontal endwise shifting of the selector 185 is effected by the preliminary engagement of the cam 230 by the two-fare lever 214; and the final movement of the two-fare lever 214 moves the entire selector and its supporting frame toward the shutter to operate the quarter shutter, the nickel shutter and one of the dime shutters, the second dime shutter 206 remaining idle. In this manner, when depression of the 50 cent admission key has admitted a fifty-cent piece and thereby elevated the selector 185 vertically to the proper level for change-throwing from a fifty-cent piece, subsequent depression of the two-fare lever throws out a quarter, a nickel and a dime aggregating forty cents.

As shown in Fig. 22, operation of the three-fare lever 215 first shifts the selector 185 still farther to the left by means of a cam 232 so that the ward 174 still engages the lug of the quarter slide 202. The ward 176 is moved out of coöperate relation with the lug 196 of the nickel shutter 204 and said lug 196 then stands between the ward 176 and the ward 175. The ward 177 remains in inoperative relation to the lug 196 of the dime shutter 206; and the ward 178 remains inoperative with the lug 196 of the dime shutter 208. Final operation of the three-fare lever 215, therefore, throws a quarter and a dime only, the nickel shutter 204 and the second dime shutter 206 remaining idle. Thus, after a fifty-cent piece has been admitted by depressing the fifty-cent admission key, operation of the three-fare lever shows an aggregate of thirty-five cents in change.

Figure 23:
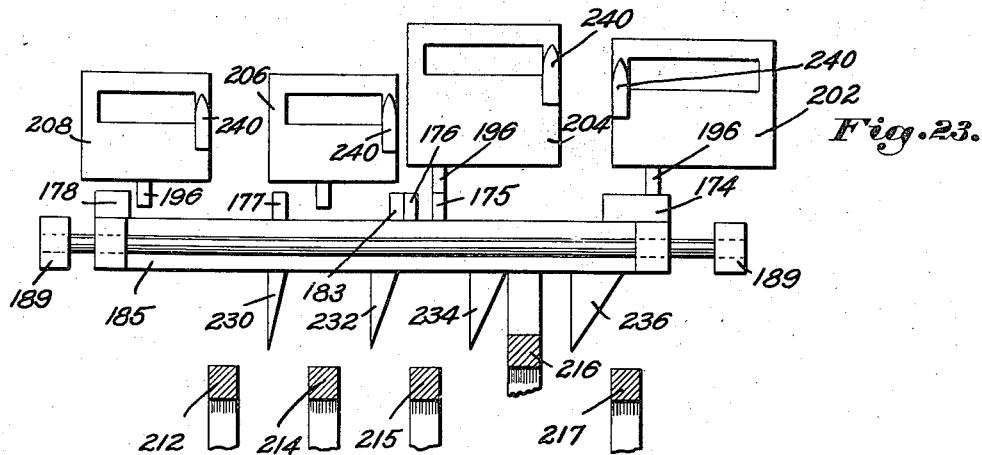

As shown in Fig. 23, operation of the four-fare lever 216 moves the selector 185 still farther to the left by means of a cam 234 with the result that the ward 174 remains in operative relation to the lug 176 of the nickel shutter 202, the ward 175 enters into operative relation with the lug 196 of the nickel shutter 204; and both the wards 177 and 178 are inoperative in respect to the two dime shutters. Thus, the fifty-cent piece lever having been admitted by depressing the fifty-cent admission key, subsequent operation of the four-fare lever 216 throws an aggregate of thirty-cents in change.

Figure 24:
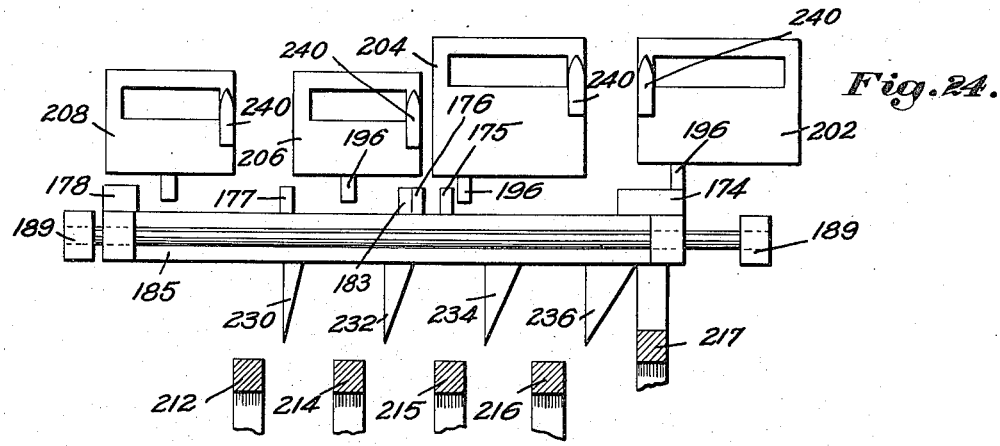
Figure 25:
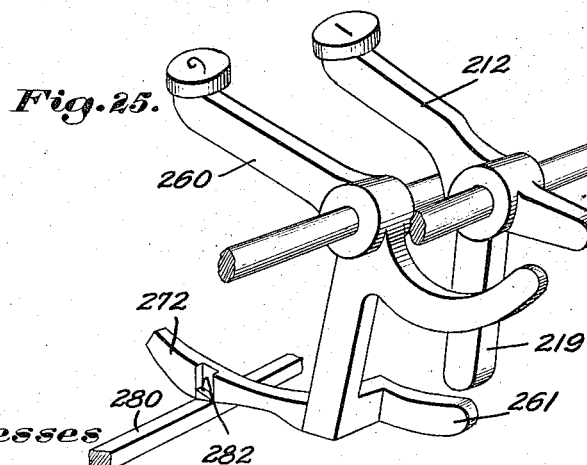

As seen in Fig. 24—operation of the five-fare lever 217 moves the selector 185 still farther to the left by means of a cam 236 with the result that the ward 174 alone continues in operative relation with the lug 196 of the quarter shutter 202, all of the other wards being inoperative. Accordingly, a fifty-cent piece having been admitted by depression of the fifty cent admission key, subsequent operation of the five-fare lever 217 throws only a quarter in change.

Whenever a shutter is moved from the idle position of Fig. 18 to the coin-releasing position of Figs. 26 or 27, the appropriate coin is released, and the next following coin in the storage raceway is held detained against escape by means of detents 240 shown in Figs. 13, 18, 26 and 27. The arrangement of these detents is preferably such that so long as a shutter remains in projected coin-releasing position, and until the shutter returns to the idle position of Fig. 18, the detent will hold the next following coin in the raceway against any possible advance travel. With such an arrangement the release of one coin must be effected completely, and the shutter must be returned thereafter to the idle position of Fig. 18, before the next following coin can move into the positions shown in Fig. 13 from which positions the same may be released.

It is desired to prevent the possibility of more than a single change-throwing operation for each operation of a coin admission key, thereby precluding the release of more than a single batch of change for each coin admitted. This may be effected for the purposes of the specific machine by a locking device well shown in Figs. 15, 18, 26 and 27.

Referring particularly to Figs. 15 and 18, the locking device comprises a preferably heavy leaf spring 242 having its lower end fixed to a convenient frame piece 243, the tendency of the spring being to rock clockwise in Fig. 18. The spring 242 carriers a block 244 which normally underlies the lower end of one of the arms 192 upon which the selector 185 swings toward and from the change releasing shutters. The normal relation of the block 244 and arm 192 are well shown in Figs. 16 and 18, the constant tendency of the spring being to press the block 244 upwardly against the bottom of the arm 192. When, in a change-throwing operation, the selector 185 and arms 192 are moved toward the left in Fig. 18 (as by depressing one of the two-fare levers 212, etc.,) the lower end of the arm 192 is moved toward the left beyond the block 244 which is thereupon sprung upwardly by the spring 242 into position at the right of the arm 192 to engage the arm 192 and prevent the return of said arm and the selector 185 to the idle position of Fig. 18, until the spring 242 and its block 244 have been deliberately depressed to release the arm 192 from the locking effect of the block 244.

Referring now to Fig. 15—a finger 250 fixed upon the setting cradle 170 overlies the spring 242, as well shown also in Figs. 16 and 18. When the cradle 170 is locked by depression of a coin admission key, the finger 270 is lifted leaving the spring 242 free to move the block 244 upwardly for the described locking action when the arm 192 is rocked to the left in Fig. 18 for a change-throwing operation. So long as the finger 250 remains elevated (and it will so remain so long as a coin admission key remains depressed) the block 244 will continue to lock the arm 192 and selector in coin-releasing position, thereby holding the detents 240 of Fig. 13 in position to prevent any additional coins entering the position from which they may be released. When, however, a coin admission key is released, permitting it and the cradle 170 to be rocked clockwise in Figs. 26 and 27 to their positions of rest, the finger 250 is thereby pressed down against its spring 242 forcing the same downwardly and removing the block 244 from the rear of the arm 192 and permitting the same to return to the position of rest shown in Fig. 18.

With the illustrative organization hereinbefore described, no change-throwing operation is possible except upon depression of the appropriate admission key and continuous retention of the key in depressed position, with the consequent rocking of the cradle 170 in a contra-clockwise direction in Figs. 26 and 27 and the maintenance of the cradle in the position to which it is so rocked. Such movement of the coin-admission mechanism permits a single change-throwing operation after which the change-throwing mechanism, particularly the selector 185, is locked by the block 244 and spring 242 against a retraction of the change-throwing operation, until the coin-admission key is released completely so that a subsequent depression thereof will be prevented by its slide locking lever 50 shown in Fig. 3, except upon the deposit and due detection of another coin of suitable denomination.

The description will next be directed to change-throwing operations in which, after admission of a fifty-cent piece, it is desired to retain in the machine from six to ten fares.

Referring to Fig. 25—the one-fare lever 212 is there shown with its pusher 219, and also a six-fare lever 260 with its pusher 261. The pushers 219 and 261 stand preferably in the same vertical plane as shown in Fig. 19. In the same manner as shown in Fig. 25, the seven-fare lever 262 and its pusher 263 are associated with the two-fare lever 214; and the eight-fare lever 264 with its pusher 265 are associated with the three-fare lever 215; and a nine-fare lever 266 with its pusher 267 is associated with the four-fare lever 216; and a ten-fare lever 268 with its pusher 269 is associated with the five-fare lever 217. Obviously, the six to ten-fare levers 260, etc., are intended to be operated for throwing change only upon admission of a fifty-cent piece by depressing the fifty-cent admission key. It is evident that, from an admitted fifty-cent piece the six-fare lever should throw the same amount of change as the one-fare lever, minus a quarter; and the seven-fare lever should throw the same amount of change as the two-fare lever, minus a quarter; and the eight-fare lever should throw the same amount of change as the three-fare lever, minus a quarter; and the nine-fare lever should throw the same amount of change as the four-fare lever, minus a quarter; and the ten-fare lever should throw the same amount of change as the five-fare lever, minus a quarter, that is to say the ten fare lever should throw no change at all. Obviously, therefore, the six to ten-fare levers 260 and 268 may operate in exactly the same manner as the corresponding levers of the one to five-fare group, omitting only the operation of the quarter shutter which is necessary for the one to five-fare group but must be excluded for the six to ten-fare group. As already described, depression of the fifty-cent admission key elevates the selector 185 to such a point that its upper row of wards 174, 175, 176, 177 and 178 are positioned on the same level with the lugs 196 on the shutters. If now the selector 185 be slightly further elevated, the effect will be to lift the quarter throwing ward 174 above the level of the lug 196 of the quarter shutter 202 so that the latter cannot be operated; while at the same time the nickel throwing wards 179 and 180 exactly duplicate the previously operative wards 175 and 176, and the dime throwing wards 181 and 182 exactly duplicate the previously operative dime throwing wards 177 and 178. Hence to exclude the quarter throwing operation appropriately to the use of the six to ten-fare group of fare levers, it is only necessary, in the specific mechanism, to lift the selector 185 vertically to the next position above that to which it is moved by depressing the fifty-cent lever. This may be effected in the manner about to be described.

Referring now to Fig. 26—depression of the fifty-cent admission key 45 lifts the selector to the position there shown which is appropriate to change-throwing operations by the one to five-fare group of fare keys, the selector having been lifted to that position by the cradle 170. If now the illustrative ten-fare lever 268 be depressed as shown in Fig. 27, a heel 272 on said lever is rocked contra-clockwise from the position of Fig. 26 to the position of Fig. 27. The heel 272 is provided with a cam on its lower surface which strikes a cam lug 274 on the cradle 170 and rocks said cradle slightly beyond the position to which it was previously rocked by depression of the fifty-cent admission key and thereby elevates the selector 185 with its wards, to the position shown in Fig. 27 in which the intermediate horizontal series of wards is positioned on the same level of the lugs 192 of the coin-releasing shutters. In other words, depression of the fifty-cent admission key lifts the selector and its wards to the Fig. 26 position appropriate to coöperation with the one to five-fare group of fare keys; and thereupon each of the six to ten-fare group of fare keys, is arranged to elevate the selector still further to the Fig. 27 position, the sole effect of such further elevation being to eliminate the quarter throwing operation while maintaining the dime and nickel throwing connections exactly as they are for coöperation with the one to five-fare group of fare levers.

Referring now to Fig. 19—when the parts occupy the position shown in Fig. 27, the parts are also as shown in Fig. 19 except that the ward 174 is inoperative, being above the level of the lug 196 on the quarter-releasing 202. As shown in Fig. 17, each of the wards 175, 176, 177 and 178 are exactly duplicated on the next lower level. Hence depression of the six-fare lever 260 will operate only the two dime releasing shuters 208 and 206 to throw an aggregate of twenty cents. The six-fare lever 262, seven-fare lever 264, eight-fare lever 266 and nine-fare lever 268 operate respectively the cams 230, 232, 234 and 236 as already described and Figs. 19 to 24 inclusive represents effects of depressing consecutively the six to ten-fare levers, bearing in mind, of course, that the quarter shutter is not operated in any such cases.

It is desirable to prevent operation of any key of the six to ten-fare group except when preceded by depression of the fifty-cent admission key. This may be effected readily by the illustrative construction shown in Figs. 2, 25, 26 and 27.

Referring to Fig. 2—a locking bar 280 is pivoted on a frame bracket 281 to move in a substantially vertical plane. As shown in Fig. 25 the locking bar 280, the parts being there in their position of rest, stands adjacent the heels 272 of the levers of the six to ten-fare group. For each heel 272 said bar carries a locking tooth 282 adapted to engage a locking seat on the heel 272 to prevent any depression of one of the fare keys, as for instance, the fare key 260 shown in Fig. 25. Reverting to Fig. 2, the right hand end of the locking bar is pivotally connected to a lug 284 on the fifty-cent admission key 45, the same being shown also in Figs. 26 and 27. The bar 280 has a jog 286 which permits it to pass beneath the quarter admission key 82, the dime admission key 98 and the nickel admission key 96 without being affected by depression of any key except the fifty-cent admission key 45 to which the bar 280 is connected. So long as the fifty-cent admission key 45 remains in the position of rest shown in Figs. 2 and 25, the locking tooth 282 will hold the fare keys of the six to ten-fare group against depression. When, however, the fifty-cent admission key 45 is depressed the locking teeth 282 are withdraw and the fare keys may be depressed to throw change. The fifty-cent admission key may be released while the ten-fare lever 268 occupies the position shown in Fig. 27 and when the fare key 268 is released it will strike the inclined rear face of the tooth 282 and slightly spring the locking rod 280 until the tooth 282 enters its seat on the heel 272 and locks the same.

The position to which the selector 185 is moved by depressing a fare key 268 in Fig. 27 and thereby rocking the cradle 170—*i. e.* the position in which the intermediate series of wards 179, etc., stand at the same level with the lugs 192, 196, of the change-releasing shutters—is the same position to which the selector 185 is lifted by depressing the quarter admission key; and the dimensions and throw of the quarter admission key are predetermined to suit this purpose. As will be understood, depression of the quarter admission key lifts all the fare keys of the six to ten fare group locked by the locking teeth 282 so that only the one to five-fare group of fare keys can be depressed following the admission of a quarter. Thus the depression of any key of the one to five-fare group will throw the same change combinations illustrated in Figs. 19 to 24 inclusive, except that the releasing of a twenty-five cent piece will be omitted in each case.

When a dime admission key is depressed, the selector 185 is lifted to the uppermost limit of its vertical movement in which the single ward 183 (Fig. 17) is alone on the level of the change-releasing shutter lugs 196. This ward 183 is shown shaded in Fig. 19 with the selector 185 in its normal position of rest as regards its endwise movement sliding on the rods 186. Thus, by depressing the dime admission key the ward 183 in Fig. 19 is lifted to position to coöperate with the lug 196 of the nickel shutter 204. If, under these circumstances, the single fare lever 212 is operated as shown in Fig. 20, a nickel alone will be released. If the two-fare lever 214 be depressed the selector 185 will be shifted to the left by reason of the cam 230 so that the ward 183 will be inoperative in respect to the nickel shutter, all of the other wards being likewise inoperative because above the level of the lugs 196 on the several shutters. Thus, upon depression of a dime admission key, there can be but a single change-throwing operation consisting in throwing a nickel by depression of the single fare lever.

It is preferred that every change-throwing operation, or in other words every fare retaining operation, be recorded or registered, and for this purpose suitable registers are shown in Figs. 2, 7, and 28 to 31 inclusive. Corresponding to each fare lever is a register 290 shown in Fig. 28, said register being, if desired, of a well-known "Veeder" type and adapted to be operated by a ratchet 292. The register may be arranged upon a shaft 294 conveniently located in the machine and there operated by pawls 296 mounted one upon each fare key. Fig. 29 shows a pawl on the fare key of the one to five-fare group; and Fig. 25 shows corresponding pawls on fare keys of both groups.

As shown in Fig. 2 a drawer 300 is provided at the bottom of the machine of which a compartment 302 stands directly beneath the vertically disposed fifty-cent chute 68 to receive the fifty-cent pieces from said chute. In said drawer there is also a quarter compartment 304, a nickel compartment 306 and a dime compartment 307. Normally, as already described, there is a supply of quarters, dimes and nickels in the several storage raceways, where said coins are held to be thrown when necessary as change. When it is desired to exhaust the machine, it is preferred to release the coins from all the storage raceways into the drawer 300. For this purpose the illustrative organization comprises auxiliary coin-releasing shutter operating mechanism shown in Figs. 27 and 32. Mounted under each of the quarter releasing shutter 202, the nickel releasing shutter 204 and the dime releasing shutter 208, is a slide bar 310. The quarter slide bar 310 has a handle 312 shown in Figs. 7 and 32; the nickel slide bar has a handle 314 and the dime slide bar has a handle 316. Each slide bar (Fig. 7) has a lug 318 in position to engage a corresponding lug 319 fixed to the appropriate coin-releasing shutter so that when the slide bar 310 is pulled to the left in Fig. 7 by its handle, the lug 318 will strike the lug 319 and rock the coin-releasing shutter to coin-releasing position. In the ordinary change-throwing operation of the machine coin so released would be dropped into the pocket 210; but as shown in Fig. 32, said pocket 210 is provided with a false wall 325 adapted to be rocked out from under released coins by operation of the auxiliary coin-releasing slide 310. The false wall 325 is pivoted on a shaft 326 and an arm 327 of said wall 325 is connected by a pin-and-slot connection with the slide rod 310. When the slide rod 310 is moved to the left in Fig. 32, the false wall 325 is rocked to the position shown to permit the released coin 330 to drop down in the rear of the false wall and into the appropriate compartment in the drawer 300 beneath. As shown in Fig. 7 the exterior casing 332 completely incloses the false wall 325 and the lifting of said wall to the Fig. 32 position serves to interpose the wall between released coins and the exterior of the pocket so as to prevent extraction of the released coins. When a coin is inserted in the hopper 30, for instance a fifty-cent piece, the fifty-cent admission lever is thereby permitted its full depression to set the change-throwing mechanism in operative condition. If, at the same time, it were possible to operate the coin-discarding mechanism hereinbefore described and shown in Figs. 3, 4 and 5, it might be possible to throw a batch of change and at the same time discard and release the coin with reference to which the change was thrown. To prevent such fraud upon the machine, it is preferred that means be provided to prevent operation of the discarding mechanism whenever a coin admission key is depressed to initiate a change-throwing operation. Means to this end is shown in Fig. 3 comprising a lock 400 fixed rigidly upon a shaft 402 suitably journaled in the machine frame as shown in Fig. 14. The shaft 402 has fixed thereupon fingers 403, 404 and 405 overlying respectively the inner ends of the dime, quarter and fifty-cent admission key levers. The lock 400 is held normally in the position shown in Fig. 31 by a spring 406 and in such position said lock leaves the coin-rejecting lever 38 free to operate to reject a coin. If, however, one of the coin admission keys is depressed even slightly, it serves to rock one of the fingers 403, 404, 405, together with the shaft 402 and lock 400 clockwise in Fig. 3 so as to position the lock 400 between the shaft 402 and toe 408 on the coin rejecting lever 38, thereby positively locking the coin-rejecting mechanism against operation.

It will be understood that the above described mechanism of the specific machine is preferred to be inclosed in a suitable casing such as that represented in Figs. 1, 2, 7 and 14. The casing may be of any practicable design as will appear to those skilled in the art.

Referring to Figs. 1 and 1ª. It is preferred to employ some means for keeping continuously closed the slot through which a coin is initially introduced to the machine. For this purpose a hopper 500 may be provided in which the coin is initially deposited, the hopper having therein a swinging gate 501. The gate 501 preferably is pivoted at 502 to the hopper 500, and has at its upper end a coin-receiving incline 503 and at its lower edge a second coin-receiving incline 504. The illustrative gate 501 preferably occupies substantially an entire side of the hopper 500 and its inclines 503 and 504 extend horizontally clear across the hopper 500 and project into and across the hopper alternately in such manner that when one of said inclines is moved so as to open the coin passage in the hopper the other said incline is thereby moved so as to close the coin passage in the hopper. For instance, as shown in Fig. 1ª, a coin may be moved downwardly against the incline 503, thereby rocking the gate 501 clockwise until the upper edge of the coin has dropped past the lower end of the incline 503. Thereupon the coin strikes the incline 504 and rocks the gate 501 contraclockwise to permit the coin to pass the latter and enter the coin-receiving hopper 30. Preferably the hopper 500 and gate 501 are completely inclosed within a casing 506, which prevents any tampering with the parts.

It is to be understood that this invention is by no means limited to the specific organization, construction and mode of operation hereinbefore described for purposes of illustration; on the contrary, the invention may be variously embodied as an entirety or as to its separate features, and may be variously practised within the scope of the subjoined claims. It is not indispensable that all the features of the invention be used conjointly, since they may be used to advantage separately.

Claims:

1. A coin handling machine comprising, in combination, a plurality of coin-admission mechanisms for different denominations of coins respectively; locking means for respective coin admission mechanisms, to prevent operation of the latter except upon admission of an appropriate coin; detector means coöperating with deposited coins to govern the operation of the locking means; setting means governed by the coin-admission mechanisms, for preliminarily initiating a coin throwing operation; selective means, rendered operative by said setting means, for determining the amount of change to be thrown; coin releasing means operated by said selective means to release the change; and a plurality of change throwing keys, each arranged to throw a definite amount of change predetermined by the denomination of the coin admitted by the coin-admission mechanism.

2. A coin-handling machine comprising, in combination, a plurality of coin-admission mechanism for different denominations of coins respectively; detector controlled means coöperating with deposited coins to prevent operation of the coin-admission means except upon admission of an appropriate coin; setting means governed by the coin-admission mechanisms, for preliminarily initiating a change-throwing operation; selective means for determining the amount of change to be thrown; and a plurality of change-throwing keys, each arranged to throw a definite amount of change predetermined by the denomination of the coin admitted by the coin-admission mechanism.

3. A coin-handling machine comprising, in combination, a coin-receiving hopper to receive coins of a plurality of denominations; means to assort coins so deposited; separate key operated mechanisms for detecting and admitting the different denominations of coins respectively; detector controlled locking means to prevent operation of each coin-admission mechanism except upon deposit of a coin of the appropriate denomination; a setting cradle moved to different positions by the respective coin-admission mechanisms, to set change-throwing means appropriately to the denomination of the admitted coin; a selector constituting the coin-throwing means so moved and positioned by said setting cradle; a plurality of coin-releasing shutters for releasing as change coins of different denominations, said shutters being adapted to be operated by said selector; means for adjusting the selector appropriately to different amounts of change to be thrown; a plurality of keys for effecting said last named adjustment of the selector and for causing the same to operate the change-releasing shutters selectively appropriately to said adjustment; and means operative while a coin-admission mechanism is active, to lock the change-throwing mechanism after a single change-throwing operation thereof.

4. A coin-handling machine comprising, in combination, a coin-receiving hopper to receive coins of a plurality of denominations; means to assort coins so deposited; separate key operated mechanisms for detecting and admitting the different denominations of coins respectively; detector controlled locking means to prevent operation of each coin-admission mechanism except upon deposit of a coin of the appropriate denomination; a setting cradle moved to different positions by the respective coin-admission mechanisms, to set change-throwing means appropriately to the denomination of the admitted coin; a selector constituting the change-throwing means so moved and positioned by said setting cradle; means for releasing, as change, coins of different denominations, said means being adapted to be operated by said selector; and means for adjusting the selector appropriately to different amounts of change to be thrown.

5. A coin-handling machine comprising, in combination, a plurality of change-releasing shutters, a selector for governing operation of the same, having a plurality of selective wards disposed in different groups horizontally and vertically; means for adjusting the selector vertically to present different horizontal groups of wards in operative position; and means for adjusting the selector horizontally to present different vertical groups of wards in operative position; and change-throwing actuating means for throwing an amount of change predetermined by adjustment of said wards.

6. A coin-handling machine comprising, in combination, change-releasing means; a selector for governing operation of the change-releasing means; means supporting the selector for a substantially vertical setting movement, and endwise setting movement and transverse change-throwing movement; and means for setting and operating the selector.

7. A coin-handling machine comprising, in combination, a plurality of coin-admission mechanisms for different denominations of coins respectively; locking means for said respective coin-admission mechanisms to prevent operation of the latter except upon admission of an appropriate coin; a plurality of change-discharging means; a selector for governing operation of the same having a plurality of selective wards disposed in different groups horizontally and vertically; means for adjusting the selector vertically to present different horizontal groups of wards in operative position; means for adjusting the selector horizontally to present different vertical groups of wards in operative position; and change-throwing actuating means for throwing an amount of change predetermined by an adjustment of said wards.

8. A coin-handling machine comprising, in combination, a plurality of change-discharging means; a selector for governing operation of the same, having a plurality of selective wards disposed in different groups horizontally and vertically; means for adjusting the selector vertically to present different horizontal groups of wards in operative position; and means for adjusting the selector horizontally to present different vertical groups of wards in operative position; and change-throwing actuating means for throwing an amount of change predetermined by adjustment of said wards.

9. A coin-handling machine comprising, in combination, a coin-receiving hopper to receive coins of a plurality of denominations; means to assort coins so deposited; separate key operated mechanisms for detecting and admitting the different denominations of coins respectively; detector controlled locking means to prevent operation of each coin-admission mechanism except upon deposit of a coin of the appropriate denomination; setting means moved to different positions by the respective coin-admission mechanisms, to set change-throwing means appropriately to the denomination of the admitted coin; a selector constituting the coin-throwing means so moved and positioned by said setting means; a plurality of coin-discharging devices for releasing change coins of different denominations, said devices being adapted to be operated by said selector; means for adjusting the selector appropriately to different amounts of change to be thrown; a plurality of keys for effecting said last named adjustment of the selector and for causing the same to operate the change-discharging devices selectively appropriately to said adjustment; and means operative while a coin-admission mechanism is active, to lock the change-throwing mechanism after a single change-throwing operation thereof.

In testimony whereof, I have signed my name to this specification, in the presence of two subscribing witnesses.

EDWARD B. PAUL.

Witnesses:
 ARTHUR E. CARSON,
 ROBERT H. KAMMLER.